United States Patent
Ogata et al.

(10) Patent No.: US 11,108,075 B2
(45) Date of Patent: Aug. 31, 2021

(54) HYDRAULIC ISOTROPICALLY-PRESSURIZED BATTERY MODULES

(71) Applicant: TeraWatt Technology Inc., Santa Clara, CA (US)

(72) Inventors: Ken Ogata, Santa Clara, CA (US); Yang Yang, Santa Clara, CA (US); Hajime Hoshi, Santa Clara, CA (US); Ying Liu, Santa Clara, CA (US)

(73) Assignee: TeraWatt Technology Inc., Santa Clara, CA (US)

(*) Notice: Subject to any disclaimer, the term of this patent is extended or adjusted under 35 U.S.C. 154(b) by 0 days.

(21) Appl. No.: 16/217,002

(22) Filed: Dec. 11, 2018

(65) Prior Publication Data

US 2020/0185756 A1 Jun. 11, 2020

(51) Int. Cl.
*H01M 10/04* (2006.01)
*H01M 10/653* (2014.01)
*H01M 50/183* (2021.01)

(52) U.S. Cl.
CPC ..... *H01M 10/0481* (2013.01); *H01M 10/653* (2015.04); *H01M 50/183* (2021.01)

(58) Field of Classification Search
CPC ...... H01M 2/022; H01M 2/0275; H01M 2/06; H01M 2/08; H01M 2/1077; H01M 10/0481; H01M 10/653; H01M 2200/20; H01M 50/183
See application file for complete search history.

(56) References Cited

U.S. PATENT DOCUMENTS

| | | | |
|---|---|---|---|
| 2009/0253028 A1* | 10/2009 | Takagi | H01M 2/1077 429/62 |
| 2013/0095375 A1* | 4/2013 | Fukuda | H05K 5/069 429/179 |
| 2017/0025646 A1* | 1/2017 | Ota | H01M 10/0585 |
| 2019/0140327 A1* | 5/2019 | Fukada | B60L 3/00 |

FOREIGN PATENT DOCUMENTS

| | | |
|---|---|---|
| CN | 102064339 A | 5/2011 |
| CN | 201893411 U | 7/2011 |
| JP | 2010-034002 A | 2/2010 |
| JP | 2010034002 A * | 2/2010 |

(Continued)

OTHER PUBLICATIONS

Machine Translation of JP-2010034002-A, Ota, Takeshi. (Year: 2010).*

(Continued)

*Primary Examiner* — Mayla Gonzalez Ramos
(74) *Attorney, Agent, or Firm* — Kilpatrick Townsend & Stockton LLP

(57) ABSTRACT

Various arrangements of pressurized battery modules are detailed herein. Such a pressurized battery module may include a sealed battery module housing. The pressurized battery module may include multiple pouch cells. Each pouch cell may be located within the sealed battery module housing. The pressurized battery module may further include an insulative oil that is pressurized within the sealed housing. This insulative oil may exert pressure on an external surface of each pouch cell within the pressurized battery module.

7 Claims, 11 Drawing Sheets

(56) References Cited

FOREIGN PATENT DOCUMENTS

| | | | |
|---|---|---|---|
| JP | 2010-277796 | A | 12/2010 |
| JP | 2012-248294 | A | 12/2012 |
| JP | 2013-084459 | A | 5/2013 |
| JP | 2017-195104 | A | 10/2017 |
| WO | 2009-016335 | A1 | 2/2009 |

OTHER PUBLICATIONS

International Search Report and Written opinion dated Apr. 14, 2020 in related application no. PCT/US2019/065736, all pgs.

* cited by examiner

HYDRAULIC ISOTROPICALLY-PRESSURIZED BATTERY MODULES

CROSS-REFERENCES TO RELATED APPLICATIONS

This application is related to U.S. patent application Ser. No. 16/217,010, filed on Dec. 11, 2018, entitled "Hydraulic Isostatic Press Processes for Solid-State Batteries," the entire disclosure of which is hereby incorporated by reference for all purposes.

BACKGROUND

Certain types of batteries perform better when pressure is maintained between the batteries' electrolyte, anode, and cathode. Conventionally, to accomplish this, a jig can be used. A jig may include multiple rigid plates that are compressed toward each other using fasteners that extend between the rigid plates. The battery may be situated between the rigid plates to receive the compressive force of the jig's plates. Such an arrangement contributes weight and volume to a battery assembly. Further, such pressure may not be uniform due to variances in the thickness of the batteries or flexing of the jig's plates.

SUMMARY

Various embodiments of pressurized battery modules are presented herein. A module may include a sealed battery module housing. A module may include a plurality of pouch cells, wherein each pouch cell is within the sealed battery module housing. The module may include a liquid that is pressurized within the sealed housing, wherein the liquid exerts pressure on an external surface of each pouch cell of the plurality of pouch cells.

Embodiments of pressurized battery modules may include one or more of the following features: The liquid may be an electrically-insulative oil. Each pouch cell of the plurality of pouch cells may be cylindrical. The module may include a plurality of support pillars attached with the sealed battery module housing. Each cylindrical pouch cell of the plurality of pouch cells may be held in place within the sealed battery module housing by a subset of support pillars of the plurality of support pillars. The liquid may exert isotropic pressure to a curved sidewall of each cylindrical pouch cell of the plurality of pouch cells. The liquid may exert isotropic pressure on a top, a bottom, and a curved sidewall of each cylindrical pouch cell of the plurality of pouch cells. The module may further include a plurality of leads and a polymer-based sealant. The polymer-based sealant may create a seal for each pouch cell of the plurality of pouch cells through which a lead of the plurality of leads passes between the pouch cell and an external environment outside of the sealed battery module housing. The module may include a plurality of cylindrical poles, wherein a cylindrical pole of the plurality of cylindrical poles is present in a center of each cylindrical pouch cell of the plurality of pouch cells. The module may include a plurality of cylindrical poles, wherein an airspace is present in a center of each cylindrical pouch cell of the plurality of cylindrical pouch cells. The module may include a plurality of pouch cell arrays, wherein each pouch cell array comprises multiple pouch cells of the plurality of pouch cells pressed together. The module may include a first insulator plate and a second insulator plate, wherein the first insulator plate and the second insulator plate support each pouch cell array within the sealed battery module housing. Each pouch cell may include a sulfur-based solid-state electrolyte.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Various types of batteries may function more effectively when pressure is applied to press the active components (i.e., cathode and anode) of a battery against a separator between the active components and the electrolyte. Further, such types of battery cells may also function more effectively when operated at a relatively high temperature (e.g., above 60° C.). Pressure and heat may be isotropically distributed to battery cells by pressurizing a thermally-conductive electrically-insulative liquid that surrounds or partially surrounds each battery cell. By using a thermally-conductive electrically-insulative liquid, a consistent pressure may be applied to each battery cell and thermal energy may be evenly and efficiently dispersed among battery cells. For example, such batteries, which can be rechargeable, may be useful for use in powering propulsion of electric vehicles. Electric vehicles can benefits from lightweight batteries that have a high energy density and power density.

Different forms of battery cell pouches may be suspended within pressurized liquid, such as oil. Cylindrical battery cell pouches may each be supported by multiple support pillars. The pressurized oil may provide a same pressure on each cylinder's curved surface (and, possibly, the cylinder's top circular planar surface and/or bottom circular planar surface). Planar battery cell pouches may be stacked to form battery pouch cell arrays. The pressurized oil may provide a same pressure on each of the sides of the planar battery cell pouches. Alternatively, pressure exerted by the oil on an external surface of a first battery cell pouch may cause the first battery cell pouch to press against a second battery cell pouch, effectively resulting in each battery cell pouch of a battery cell pouch array being compressed together by the pressurized oil.

The battery cell pouches and the pressurized oil may be housed within a sealed housing. The sealed housing may maintain the pressurization of the oil, and, thus, the oil does not need to be actively pressurized within the housing. The oil may be actively or passively circulated within the battery housing to distribute heat evenly. In some embodiments, an active heating element heats the sealed housing or pressurized oil to a temperature at which the battery cells function more effectively (e.g., greater energy density, greater power density).

Figure 1:
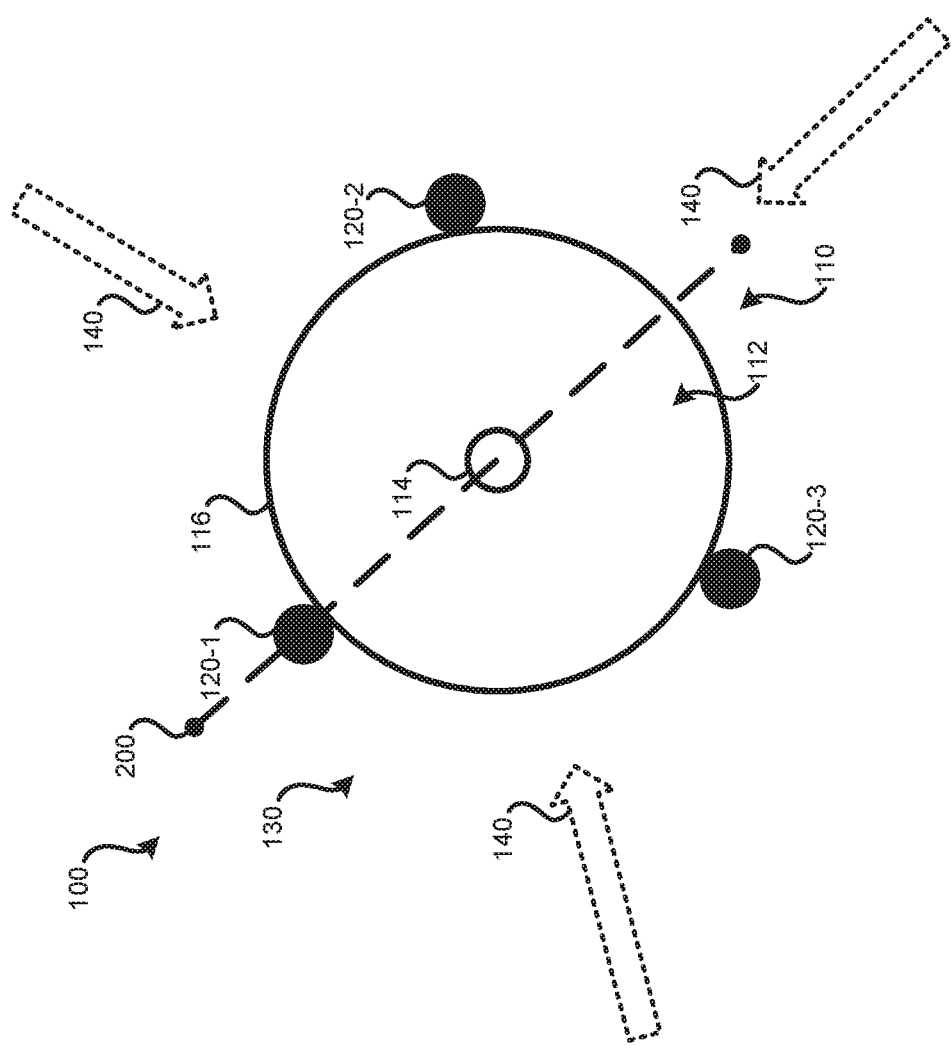
FIG. 1 illustrates an embodiment of a cylindrical battery cell pouch.

FIG. 1 illustrates an embodiment of a cylindrical pouch cell system 100. The illustrated view of cylindrical pouch cell system 100 is from above. Cylindrical pouch cell system 100 may include: cylindrical pouch cell 110; supports 120; and pressurized liquid 130. Cylindrical pouch cell 110 may include a jelly-roll style or cylindrical-style active components 112. Active components can include a cathode, an anode, and an electrolyte. Cylindrical pouch cell 110 may be a solid-state battery, meaning the cathode, anode are solid, rather than liquid or polymer based. For example, cylindrical pouch cell 110 may use a sulfur-based solid-state electrolyte or Li-ion conductive polymer electrolyte. Cylindrical pouch cell 110 may be a sulfur oxide battery pouch. Other types of battery pouches may be possible, such as non-solid state batteries.

Active components 112 may be surrounded by deformable pouch housing 116. Deformable pouch housing 116 may allow pressure exerted on an external surface of cylindrical pouch cell 110 to be transferred to active components 112, thus causing the anode, cathode, and electrolyte to be pressed together. In the center of cylindrical pouch cell 110, center region 114 may be presented. Therefore, deformable pouch housing 116 may not be sufficiently rigid such that is can resist the pressure exerted by pressurized liquid without somewhat deforming. Deformable pouch housing 116 (and thus cylindrical pouch cell 110) may have a diameter of between 15 mm and 50 mm. Center region 114 may be airspace or may be pole, such as a metallic pole.

To hold cylindrical pouch cell 110 in a particular location and orientation, multiple supports 120 may be present. In the illustrated embodiment three cylindrical support pillars are present: support 120-1, support 120-2, and support 120-3. These supports may be insulative. These supports may be anchored on the top and bottom to a sealed housing in which cylindrical pouch cell 110 is located. Therefore, in addition to holding cylindrical pouch cell 110 in a particular location, supports 120 may contribute to the structural rigidity of the sealed housing. While the illustrated embodiment of FIG. 1 illustrates three supports 120 dispersed at approximately 120° around cylindrical pouch cell 110, in other embodiments, greater or fewer numbers of supports may be used to hold cylindrical pouch cell 110 in place. For example, a single differently shaped support may be used to hold cylindrical pouch cell 110 in place.

Surrounding cylindrical pouch cell 110 may be a thermally-conductive electrically-insulative pressurized liquid 130, such as an oil. This oil may be pressurized such that hydraulic pressure is isotropically applied to deformable pouch housing 116, at least along the curved surface of the cylinder. This isotropic pressure exerted by pressurized liquid 130 is visualized by arrows 140. In some embodiments, pressurized liquid 130 is pressurized such that at least 1 MPa (145 pound-force per square inch). Such a pressure may cause the electrolyte within active components 112 to remain pressed against the cathode and anode.

Figure 2:
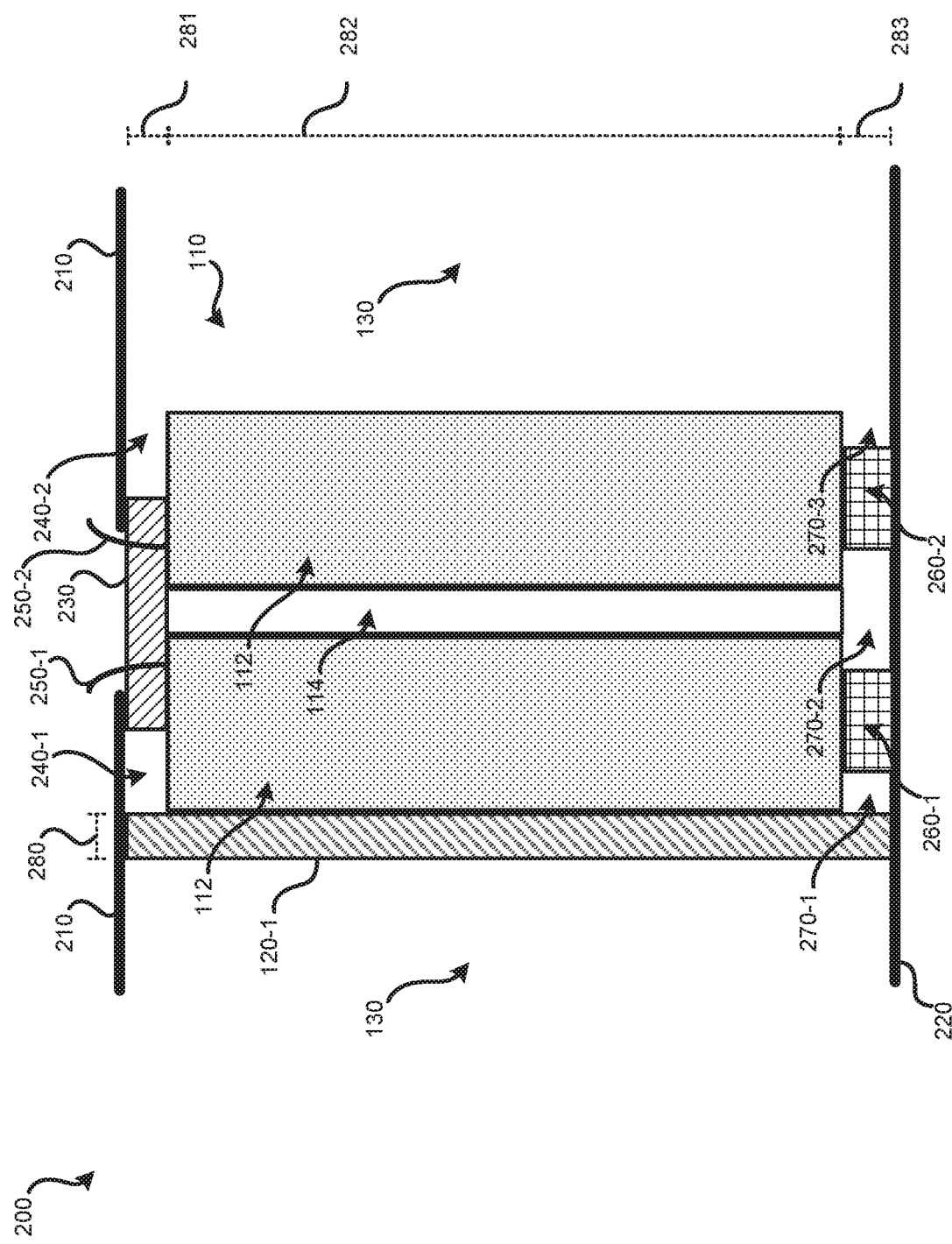
FIG. 2 illustrates an embodiment of a cylindrical battery cell pouch cross section.

Illustrated in FIG. 1 is a location of cross section 200. FIG. 2 illustrates cylindrical battery cell pouch cross section 200. Cross section 200 illustrates a side view of a cross section of cylindrical pouch cell 110. Cross section 200 illustrates: support 120-1; active components 112; center region 114; pressurized liquid 130; sealed housing top 210; sealed housing bottom 220; insulative seal 230; top gap spaces 240; leads 250; base insulators 260; and bottom gap spaces 270. A single support 120-1 is visible due to the location of the cross section noted in FIG. 1. Support 120-1 may be between 1 mm and 100 mm in width as indicated by distance 280. Cylindrical pouch cell 110 may be between 300 mm and 1000 mm in height, as indicated by distance 282.

In order to make the charge of cylindrical pouch cell 110 usable, electrical connections need to be made with the anode and cathode of active components 112. Leads 250-1 and 250-2 may pass through insulative seal 230 to the anode and cathode of active components 112, respectively. Insulative seal 230 may create a seal between cylindrical pouch cell 110 and the sealed housing. Insulative seal 230 may be a polymer based sealant and may be nonconductive. Sealed housing top 210 may have an opening to allow leads 250 to protrude. Insulative seal 230 may form a seal between cylindrical pouch cell 110 and sealed housing top 210 such that an opening in sealed housing top 210 can be present without pressurized liquid 130 escaping (or causing depressurization). Insulative seal 230 may be between 1 mm and 100 mm in height, as indicated by distance 281.

Present between cylindrical pouch cell 110 and sealed housing top 210 may be top gap spaces 240 (e.g., 240-1, 240-2). In some embodiments, these gaps may be left empty, thus allowing pressurized liquid 130 to enter top gap spaces 240 and exert pressure on a top surface of cylindrical pouch cell 110. Similarly, present between cylindrical pouch cell 110 and sealed housing bottom 220 may be bottom gap spaces 270 (e.g., 270-1, 270-2, 270-3). In some embodiments, these gaps may be left empty, thus allowing pressurized liquid 130 to enter bottom gap spaces 270 and exert pressure on a bottom surface of cylindrical pouch cell 110. Therefore, pressurized liquid 130 may exert pressure against the rounded sidewall, a top circular surface, and a bottom circular surface of deformable pouch housing 116. In other embodiments, top gap spaces 240, bottom gap spaces 270, or both may be filled or sealed such that pressurized oil does not enter these regions. If pressurized liquid 130 does not enter these regions, the isotropic pressure exerted by pressurized liquid 130 may only be exerted on the curved sidewall of cylindrical pouch cell 110.

Base insulators 260 (260-1, 260-2) may provide a base for cylindrical pouch cell 110 to stand on to maintain a distance between cylindrical pouch cell 110 and sealed housing bottom 220. As illustrated, two base insulators 260 are present, in other embodiments, greater or fewer numbers of base insulators are present. Base insulators 260 may be between 1 mm and 100 mm in height, as indicated by distance 283.

Figure 3:
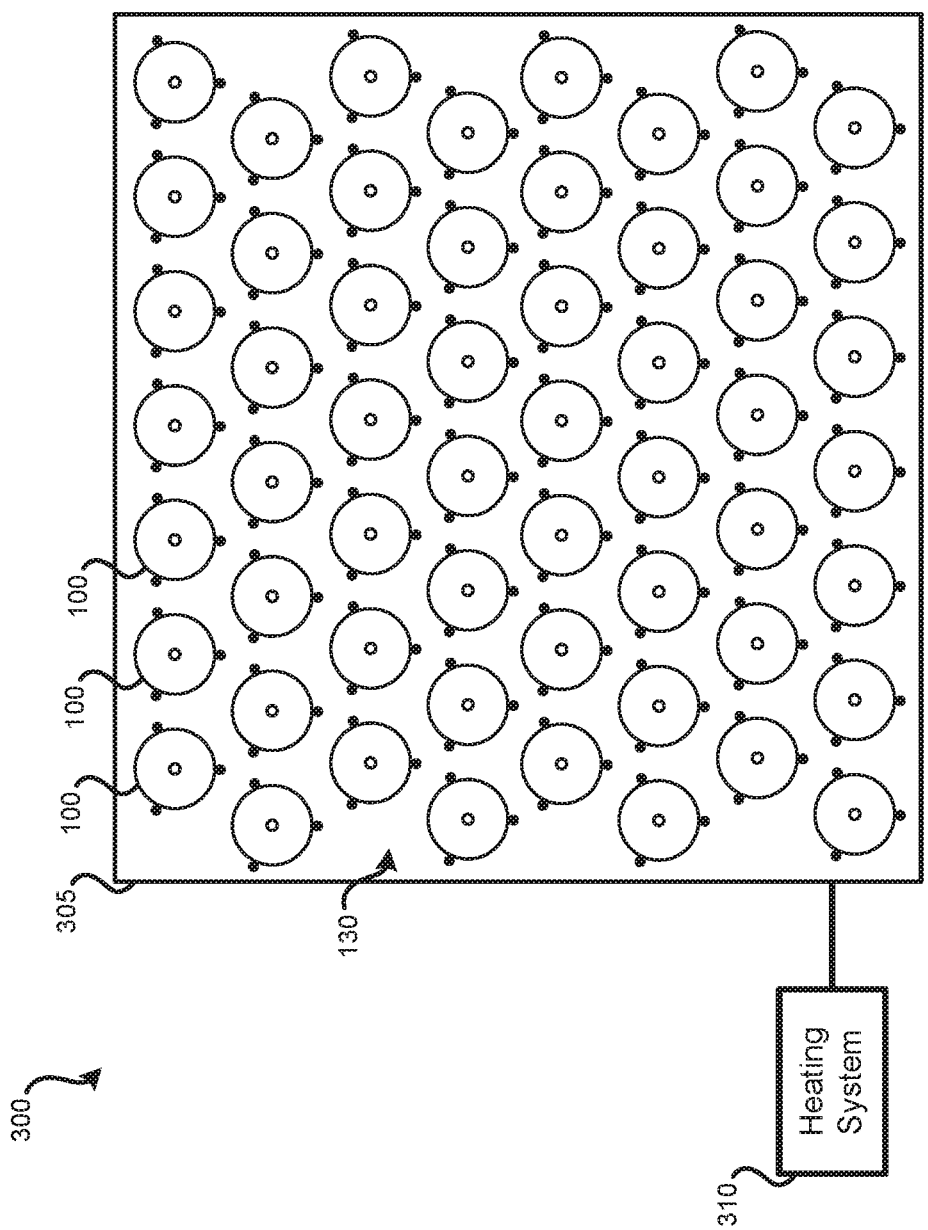
FIG. 3 illustrates an embodiment of a pressurized battery module that includes cylindrical battery cell pouches.

FIG. 3 illustrates an embodiment of a pressurized battery module 300 that includes cylindrical battery cell pouches. Pressurized battery module 300 is illustrated from a top view. Pressurized battery module 300 includes multiple cylindrical pouch cell systems 100. For instance, hundreds of cylindrical pouch cell systems 100 may be present within sealed housing 305. Sealed housing 305, which includes sealed housing top 210 and sealed housing bottom 220. The packing ratio of the cylindrical pouch cells to pressurized liquid space may be between 10% and 90.7%. In some embodiments, the cylindrical pouch cell systems 100 are arranged in offset rows. Cylindrical pouch cell systems 100 may be arranged to be parallel with each other.

In some embodiments, heating system 310 is present. Cylindrical pouch cells may function more efficiently when heated, such as to at least 60° C. Heating system 310 may include heating elements that are arranged on an exterior of sealed housing 305. Heating system 310 may alternatively have heating elements within sealed housing 305. In some embodiments, heating system 310 may include a circulator within sealed housing 305 to circulate pressurized liquid 130 to more evenly heat pressurized liquid 130. Pressurized liquid 130 may have a relatively high thermal conductivity, therefore active circulation of pressurized liquid 130 may not be needed.

Figure 4:
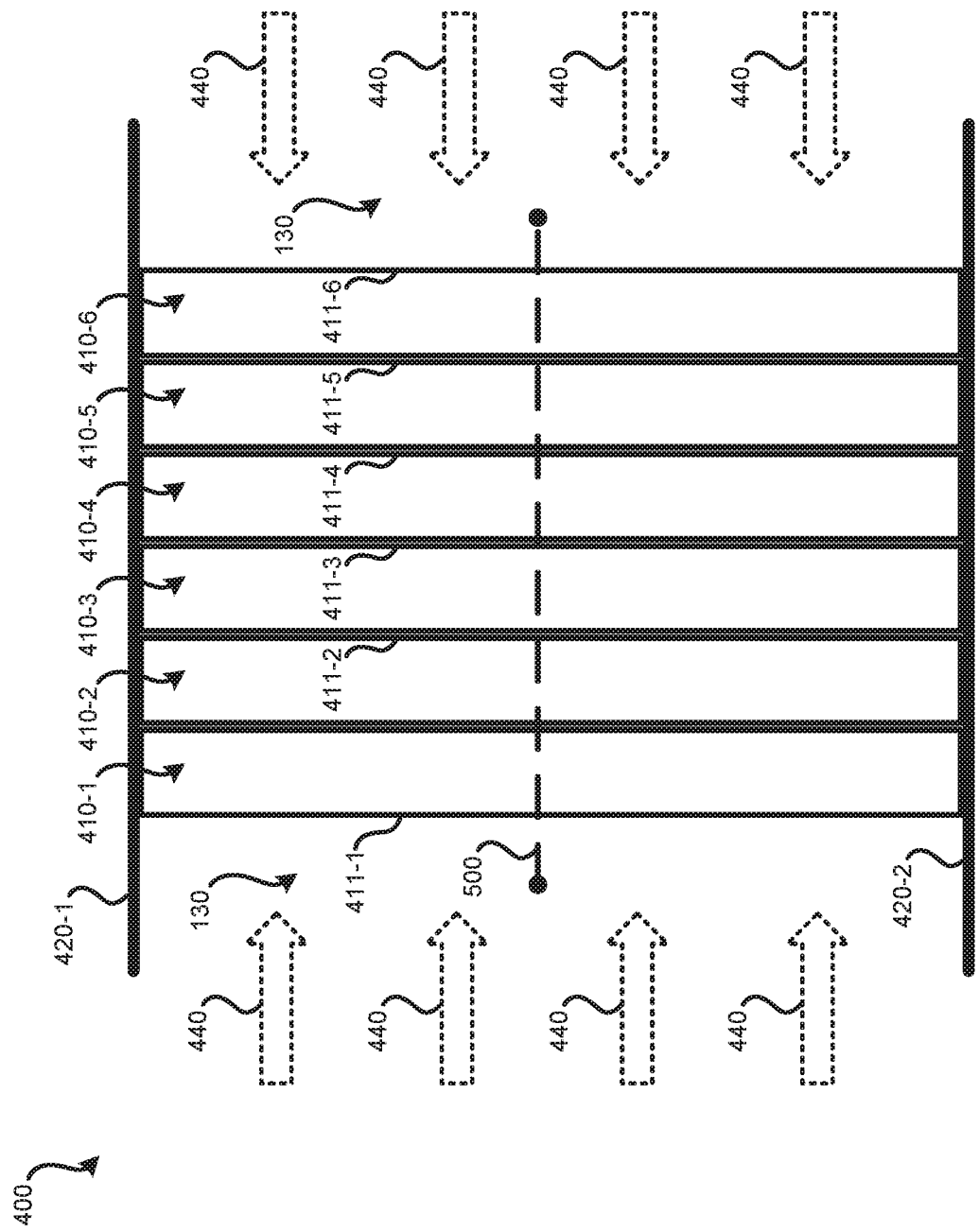
FIG. 4 illustrates an embodiment of a planar battery cell pouch array.

While FIGS. 1-3 are focused on cylindrical pouch cells, other shapes of pouch cells may also be used, such as planar pouch cells. Such pouch cells may be stackable to form pouch cell arrays. FIG. 4 illustrates a top view of an embodiment of a planar cell array system 400. Multiple pouch cells, which may generally be rectangular and planar in shape, may be stacked against each other. In the illustrated embodiment of FIG. 4, six pouch cells (410-1, 410-2, 410-3, 410-4, 410-5, and 410-6) are stacked against each other. In other embodiments, greater or fewer numbers of pouch cells may be present. In some embodiments, pouch cells 410 may not be stacked to form arrays. Supporting plates 420-1 and 420-2 may be used to support pouch cells 410 and hold in place within a sealed housing.

Within each of pouch cells 410 may be a solid-state battery cell, meaning the cathode, anode, and electrolyte are solid, rather than liquid or polymer based. For example, pouch cell 410-1 may use a sulfur-based solid-state electrolyte. Pouch cell 410-1 may be a sulfur oxide battery pouch. Other types of battery pouches may be possible, such as non-solid state batteries.

Active components with each pouch cell of pouch cells 410 may be surrounded by deformable pouch housing of deformable pouch housings 411. Deformable pouch housings 411 may allow pressure exerted on an external surface of pouch cells 410 to be transferred to active components within each pouch cell, thus causing the anode, cathode, and electrolyte to be pressed together. Therefore, deformable pouch housings 411 may not be sufficiently rigid such that is can resist the pressure exerted by pressurized liquid without somewhat deforming. Center region 114 may be airspace or may be pole, such as a metallic pole.

Surrounding pouch cells 410 may be a thermally-conductive electrically-insulative pressurized liquid 130, such as an oil. This oil may be pressurized such that hydraulic pressure is isotropically applied to deformable pouch housings 411, at least along exposed surfaces of the pouch cells 410. This isotropic pressure exerted by pressurized liquid 130 is visualized by arrows 440. In some embodiments, pressurized liquid 130 is pressurized such that at least 1 MPa (145 pound-force per square inch). Such a pressure may cause the electrolyte within active components of pouch cells 410 to remain pressed against the cathode and anode.

Pressurized liquid 130 may exert isotropic pressure on exposed exterior surfaces of pouch cells 410. In some embodiments pouch cells 410 are pressed against each other such that pressurized liquid 130 only makes contact with the outermost pouch cells within an array, such as pouch cell 410-1 and 410-6. In such embodiments, pressure is applied to pouch cells 410-2 through 410-5 via the transfer of force through pouch cells 410-1 and 410-6. In other embodiments, pressurized liquid can penetrate between pouch cells within an array. For example, pressurized liquid may be present between pouch cell 410-3 and pouch cell 410-4. In such embodiments, pressurized liquid 130 may directly exert compressive pressure on each pouch cell 410.

Figure 5:
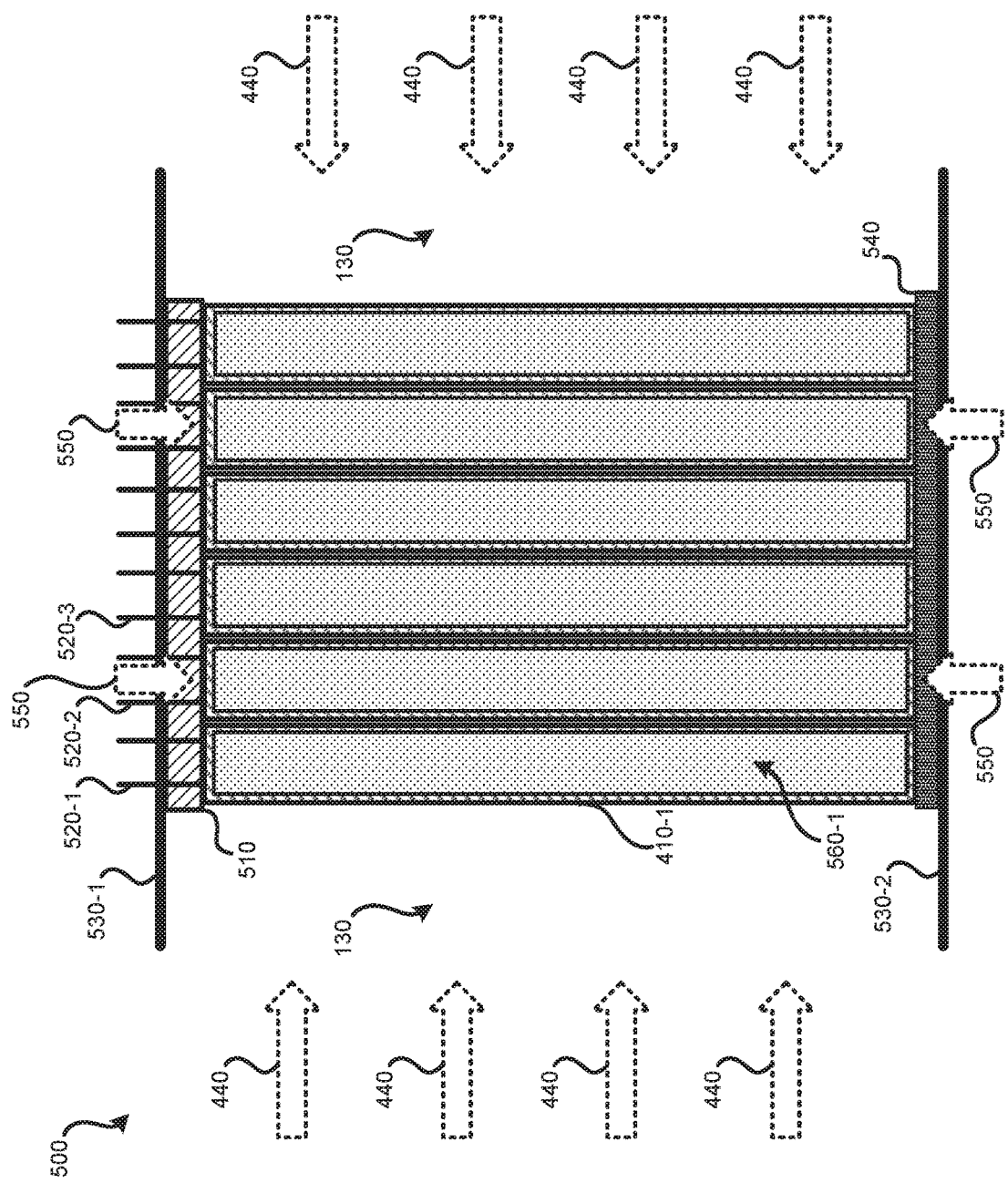
FIG. 5 illustrates an embodiment of a planar battery cell pouch array cross section.

A cross section 500 is illustrated in FIG. 4. FIG. 5 illustrates cross section 500 of an embodiment of a planar battery cell pouch array. Visible in each pouch cell (such as pouch cell 410-1) is active components 560. Active components 560, such as active components 560-1, may include an anode, a cathode, and an electrolyte.

Base insulator 540 may support each pouch cell 410 of the pouch cell array and provide an insulative buffer between sealed housing bottom 530-2 and pouch cells 410. Insulative seal 510 may provide a top support and buffer between sealed housing top 530-1 and pouch cells 410. Leads 520 may pass through insulative seal 510 and may electrically connect with active components of pouch cells 410. Two leads may be present for each pouch cell, a first lead to connect with an anode of a pouch cell and a second lead to connect with a cathode of a pouch cell. For simplicity, only some of the illustrated leads have been labeled. Holes can be present with sealed housing top 530-1 to allow leads 520 to pass to the exterior environment. Insulative seal 510 may seal the interior environment of the sealed housing from the exterior to prevent pressurized liquid 130 from escaping from the interior of the pressurized housing. Insulative seal 510 may be a polymer based sealant and may be nonconductive.

In some embodiments, pressurized liquid 130 may only apply pressure to pouch cells 410 in the directions indicated by arrows 440. Pressurized liquid 130 may be prevented from exerted force on a top and bottom of each pouch cell by insulative seal 510 and base insulator 540. In other embodiments, pressurized liquid 130 may additionally apply pressure to pouch cells 410 on a top, a bottom, or both (as illustrated by arrows 550). By not sealing pouch cells 410 to insulative seal 510, base insulator 540, or both, pressurized liquid 130 may penetrate regions between insulative seal 510, base insulator 540, and pouch cells 410, resulting in the isotropic pressure being exerted on the top, bottom, or both of pouch cells 410.

Figure 6:
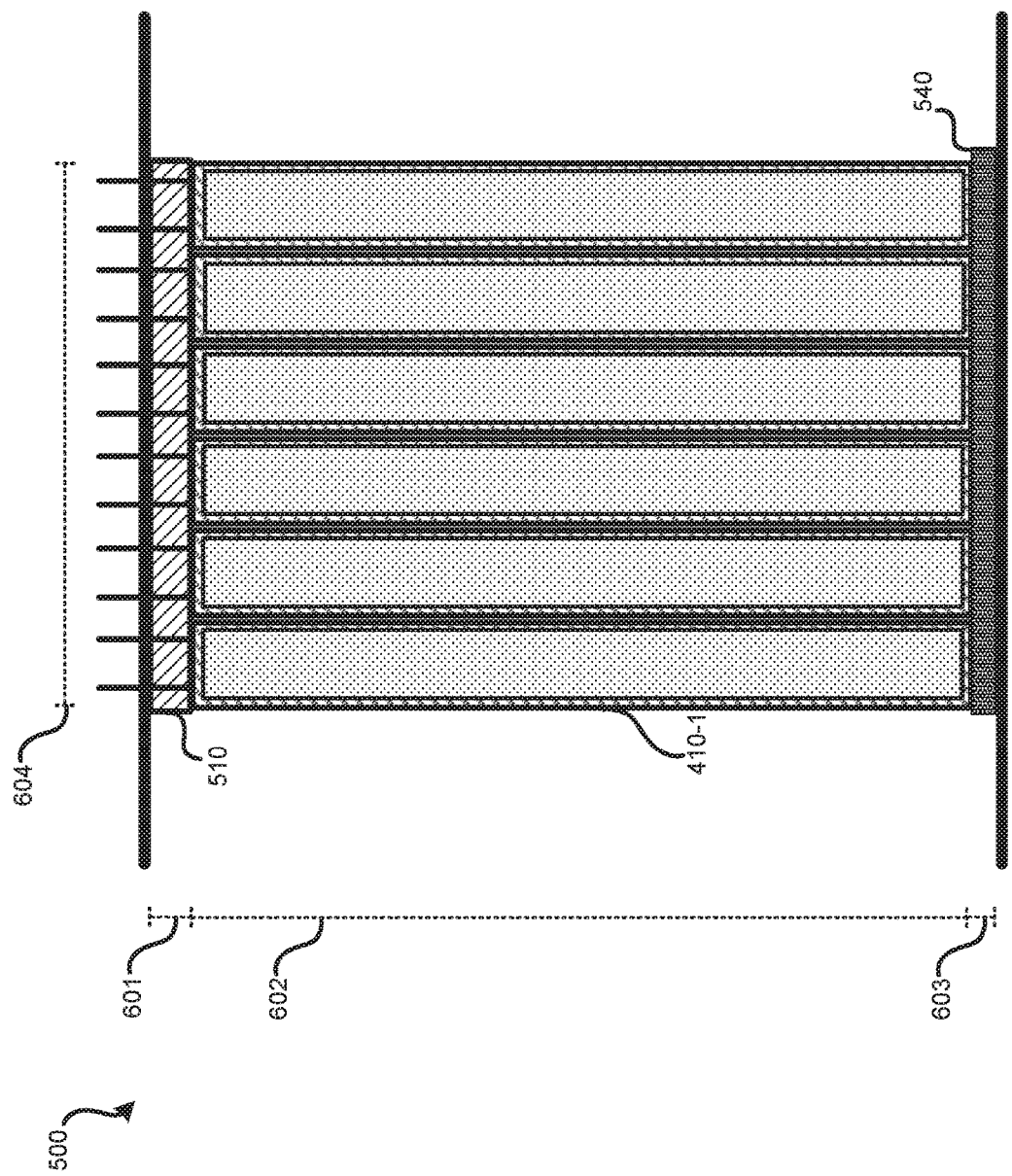
FIG. 6 illustrates another embodiment of a planar battery cell pouch array cross section.

FIG. 6 illustrates another embodiment of a planar battery cell pouch array cross section. The pouch cell array may be between 10 mm and 100 mm in width. The pouch cell array may be between 300 mm and 3000 mm in height. Insulative seal 510 may be between 1 mm and 100 mm in height. Base insulator 540 may be between 1 mm and 100 mm in height. Such measurements may be varied based on the specific application of the battery and battery module in which the pouch arrays are incorporated.

Figure 7:
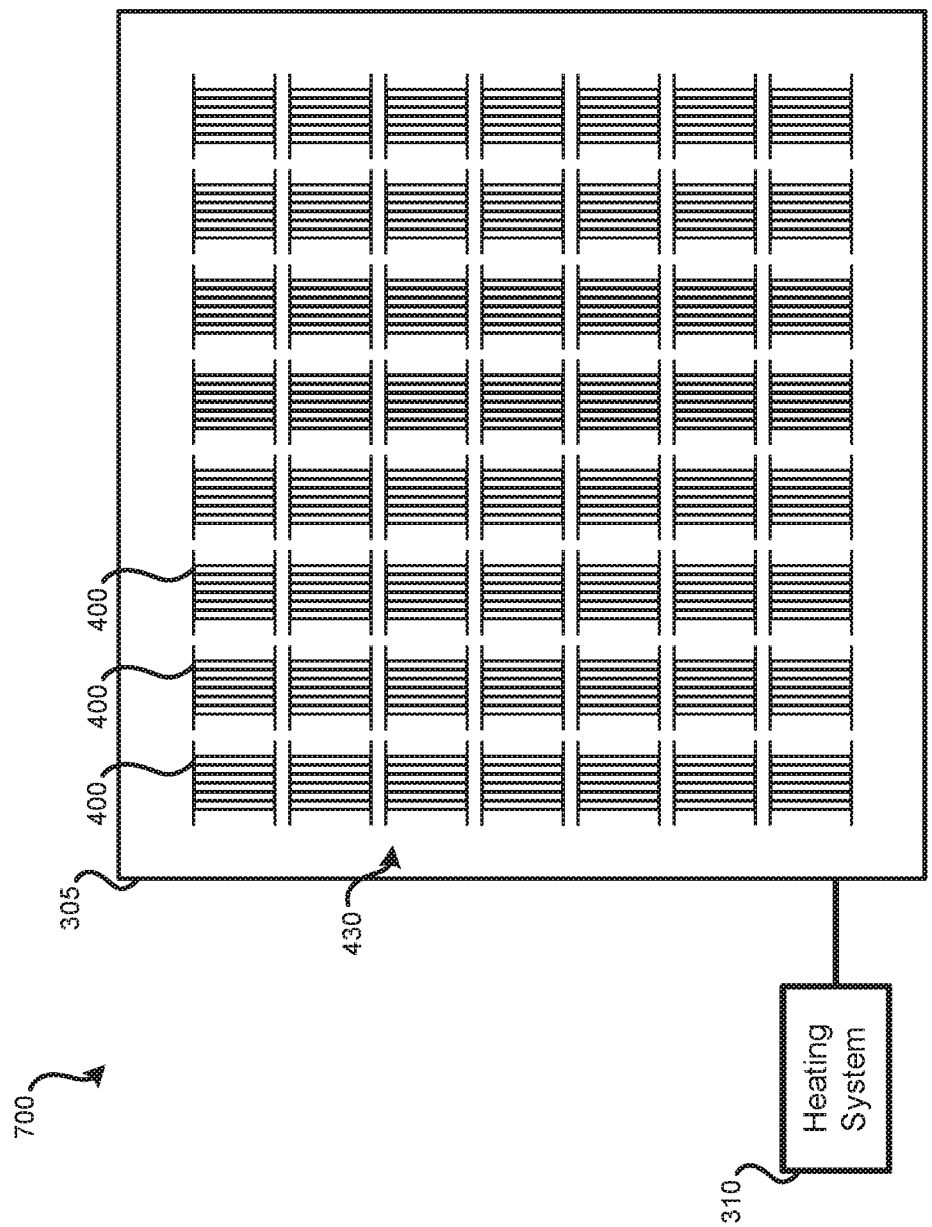
FIG. 7 illustrates an embodiment of a pressurized battery module that includes planar battery cell pouch arrays.

FIG. 7 illustrates an embodiment of a pressurized battery module 700 that includes planar battery cell pouch arrays. Pressurized battery module 700 is illustrated from a top view. Pressurized battery module 700 includes multiple pouch cell array systems 400. For instance, hundreds of pouch cell array systems 400 may be present within sealed housing 305. Sealed housing 305, which includes sealed housing top 530-1 and sealed housing bottom 530-2. The packing ratio of the planar pouch cell arrays to pressurized liquid space may be between 10% and 90%. In some embodiments, the pouch cell array systems 400 are arranged in rows or a grid. Pouch cell array systems 400 may be arranged to be vertically parallel with each other.

In some embodiments, heating system 310 is present. Cylindrical pouch cells may function more efficiently when heated, such as to at least 60° C. Heating system 310 may include heating elements that are arranged on an exterior of sealed housing 305. Heating system 310 may alternatively have heating elements within sealed housing 305. In some embodiments, heating system 310 may include a circulator within sealed housing 305 to circulate pressurized liquid 130 to more evenly heat pressurized liquid 130. Pressurized liquid 130 may have a relatively high thermal conductivity, therefore active circulation of pressurized liquid 130 may not be needed.

While battery cells as detailed herein may be housed in a pressurized environment, when such battery cells are manufactured, part of the manufacturing process, which can be referred to as an activation process, may involve a process being performed to form improved contact between a battery cell's electrolyte and the battery cell's anode and/or between the battery cell's electrolyte and the battery cell's cathode. As previously detailed, various types of batteries, such as cylindrical, jelly-roll battery cells, may function more effectively when pressure is applied to press the active components (i.e., cathode and/or anode) of the battery cell against the electrolyte. Further, some of such types of battery cells in use of Sulfur or oxide based solid-state electrolyte may also function more effectively when operated at a relatively high temperature (e.g., above 60° C.). To manufacture such battery cells, improved contact between the active components and the electrolyte may be achieved by applying a pressure and temperature greater than the pressure and temperature that is to be applied during subsequent operating conditions.

Using a thermally-conductive electrically-insulative liquid, a consistent pressure may be applied to an exterior of each battery cell and, possibly, thermal energy may be evenly and efficiently dispersed among battery cells. This pressure and increased temperature may be maintained for a period of time, followed by the pressure being released and the temperature being decreased. Once this process has been performed, the battery cell may be referred to as semi-active.

The semi-active battery cell may be permanently installed within a battery module. Within the battery module, the semi-active battery cell may be re-pressurized, however not to as high of a pressure as during the activation process. The temperature may also be increased during operation, however, possibly not up to the pressure level of the activation process. The battery cell may exhibit improved operating characteristics (including greater power density and/or greater energy density) than if the activation process is not performed.

Figure 8:
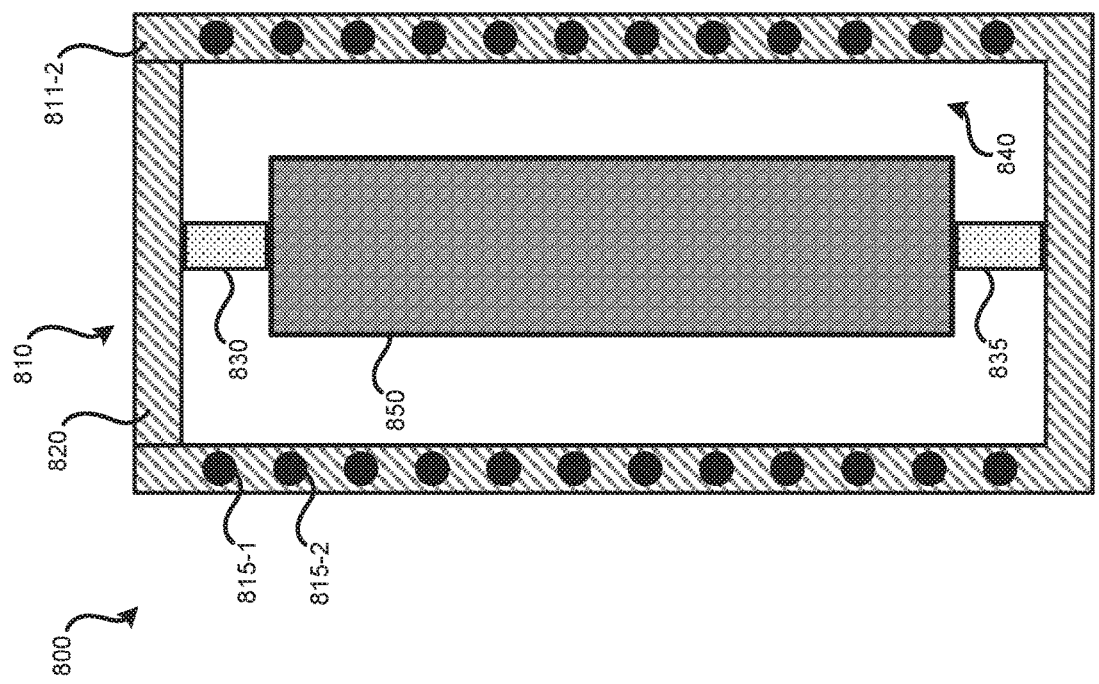
FIG. 8 illustrates a side view of an embodiment of a battery cell activation system.

Further detail regarding such systems and processes is provided in relation to FIGS. 8-11. FIG. 8 illustrates a side view of an embodiment of a battery cell activation system 800. Battery cell activation system 800 may include: sealable housing 810 (which includes sidewall 810-1 and sidewall 810-2); cap 820; heating elements 815; top battery cell support 830; bottom battery support 835; and liquid cavity 840.

Sealable housing 810 may be a rigid housing which can be sealed and maintain an increased pressure level within sealed housing 810 as compared to the external ambient environment. Sealable housing 810 may be metal. Within one or more sidewalls of sealable housing 810 (such as sidewalls 810-1 and 810-2) may be heating elements 815. Heating elements 815 may be resistive heating elements, which can also be referred to as Joule heating or Ohmic heating elements, which produce heat when an electrical current is present. Heating elements 815 may be dispersed throughout sidewalls 810-2 and 810-2 such that heat is approximately evenly applied to liquid cavity 840.

Sealable housing 810 may interface with removable cap 820. Cap 820 may be removable such that battery cell 850 may be removably inserted within liquid cavity 840. Cap 820 may seal with sealable housing 810 such that pressure created within liquid cavity 840 does not dislodge cap 820. While the illustrated embodiment shows cap 820 atop sealable housing 810, it should be understood that an access panel elsewhere on sealable housing 810 may be used instead of on top.

Within sealable housing 810 may be various supports, such as top battery cell support 830 and bottom battery support 835. Bottom battery support 835 may hold battery cell 850 elevated from a bottom of liquid cavity 840. Top battery cell support 830 may be affixed to cap 820 and may help hold battery cell 850 in a fixed location within liquid cavity 840.

Battery cell 850 may be a cylindrical battery cell. A "jelly-roll" style battery cell may be constructed by different materials being layered on each other then rolled into a cylinder and placed in a cylindrical housing. For example, a first layer may be an anode layer, a second layer may be an electrolyte layer, and a third layer may be a cathode layer. Additional layers may be present, such as interface layers between the anode and electrolyte and/or between the cathode and the electrolyte. Battery cell 850 may be wrapped in a flexible membrane. A flexible membrane may prevent liquid from penetrating to within the cylindrical battery cell. The flexible membrane may provide little resistance to pressure and, thus, may allow external pressure to exert pressure on the layer components of the cylindrical battery cell. Such pressure may result in the anode being pressed to the electrolyte and/or the cathode being pressed to the electrolyte.

Battery cell 850 may be a solid state battery cell. The electrolyte used may be a Li-ion-conductive polymer, or sulfur/oxide based solid-state electrolyte. The power density of a battery cell that used such an electrolyte may be increased by a large amount of contact being presented between the electrolyte, the anode, and the cathode.

Liquid cavity 840 may be formed by an open space within sealable housing 810. Liquid cavity 840 may be filled with a liquid that is electrically nonconductive and thermally conductive. In some embodiments, oil is used. The liquid used to fill liquid cavity 840 may be the same type of liquid used to fill sealed housing 305. Liquid cavity 840 may be kept at least partially filled with liquid. Battery cell 850 may be inserted, the remained of liquid cavity 840 filled with liquid, then sealable housing 810 pressurized. While pressurized heat may be applied to battery cell 850 via heating elements 815. Heating elements 815 may heat sealable housing 810, which heats liquid in liquid cavity 840, which, in turn, heats battery cell 850. The heat may be well dispersed such that approximately the same temperature liquid is present around the sides, top, and bottom of battery cell 850. By using liquid to transfer the heat between the heating elements 815 and battery cell 850 rather than air, the heat is transferred significantly quicker, thus allowing battery cell 850 to heat up quicker.

In some embodiments, rather than heating elements 815 being embedded in sidewalls 811, heating elements 815 may be external to sidewalls 811 by being located with liquid cavity 840 or outside of sealable housing 810. In such an embodiment, heating elements 815 may be wrapped against an external surface of sealable housing 810.

Figure 9:
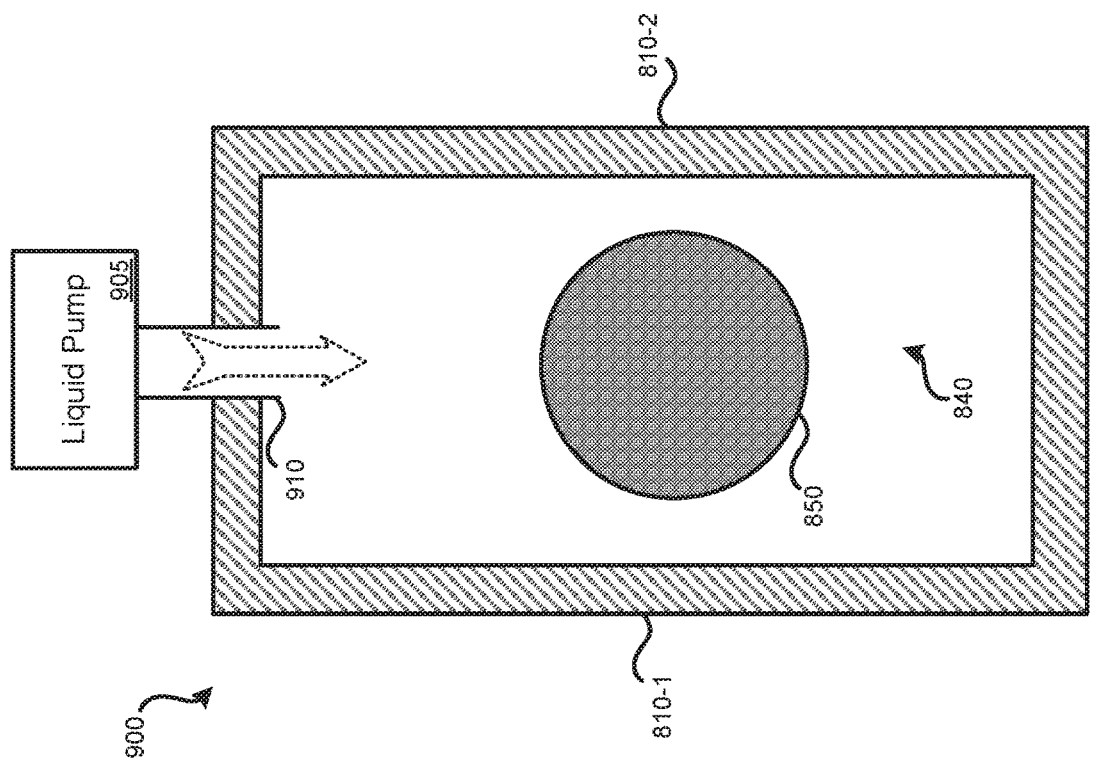
FIG. 9 illustrates a top view of an embodiment of a battery cell activation system.

FIG. 9 illustrates a top view of an embodiment of a battery cell activation system 900. Battery cell activation system 900 may represent an embodiment of battery cell activation system 800 of FIG. 8. Battery cell activation system 900 may include liquid pump 905. Liquid pump 905 may serve multiple purposes: liquid pump 905 may be used to fill liquid cavity 840 completely or nearly completely with liquid after battery cell 850 has been positioned within liquid cavity 840; liquid pump 905 may be used to increase, decrease, and control the pressure within sealable housing 810 after sealable housing 810 has been sealed; and liquid pump 905 may be used to circulate liquid within liquid cavity 840. Liquid pump 905 may have a connection with liquid cavity 840 via piping 910 that allows liquid to be pumped into and, possibly, pumped out of liquid cavity 840.

Figure 10:
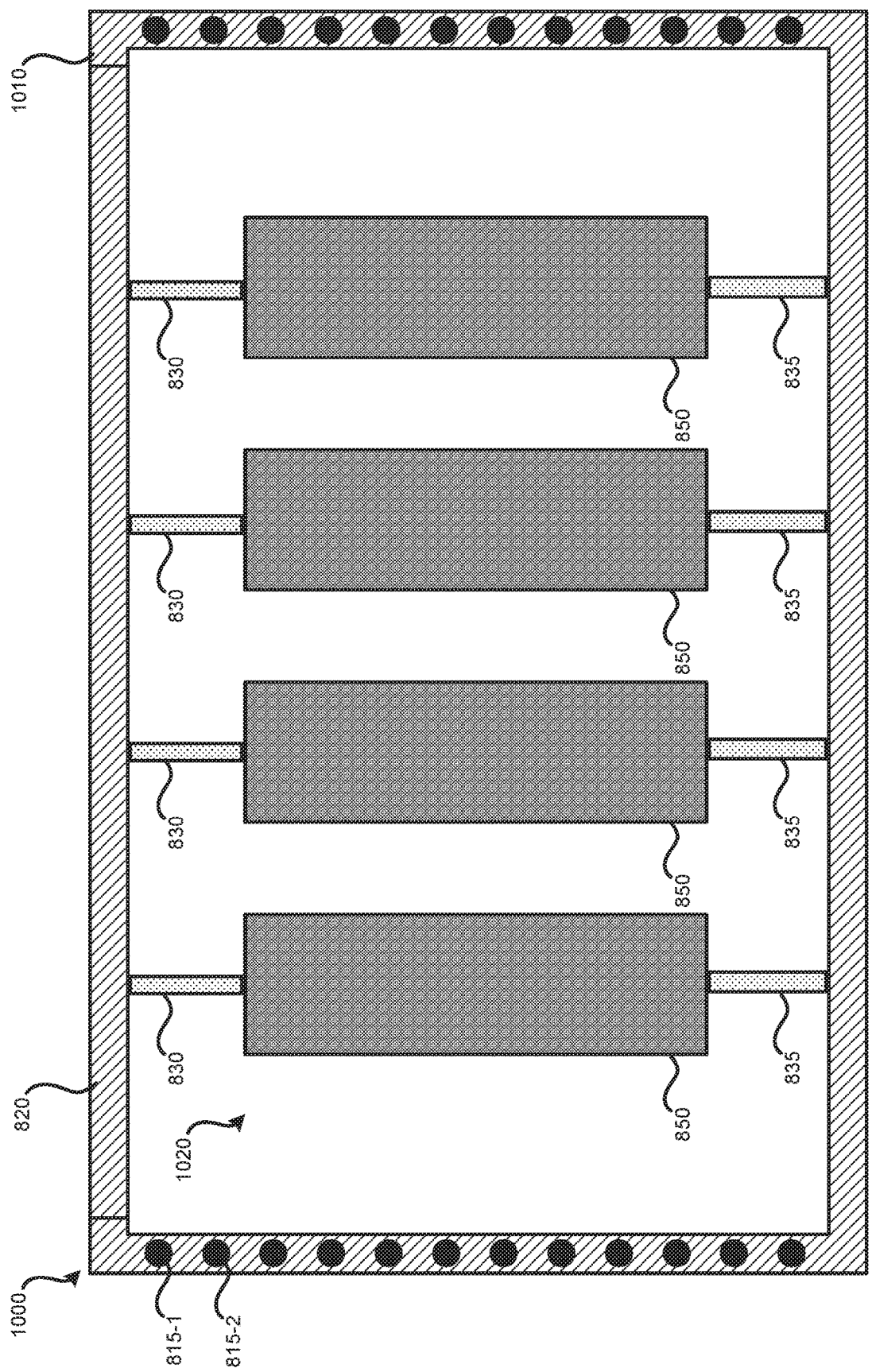
FIG. 10 illustrates a side view of another embodiment of a battery cell activation system.

FIG. 10 illustrates a side view of an embodiment of a battery cell activation system 1000. Battery cell activation system 1000 may function similarly to battery cell activation system 800 (and possibly 900) of FIGS. 8 and 9, respectively. Battery cell activation system 1000 allows multiple battery cells to be activated simultaneously. In the illustrated example, four battery cells 850 are present within sealable housing 1010. This number of battery cells is for example purposes only; in other embodiments, fewer or greater numbers of battery cells may be present, such as tens or even hundreds of battery cells. Since liquid within liquid cavity 1020 is used to apply pressure to external surfaces of battery cells 850, the pressure is isotropic on the external battery cell surfaces.

Figure 11:
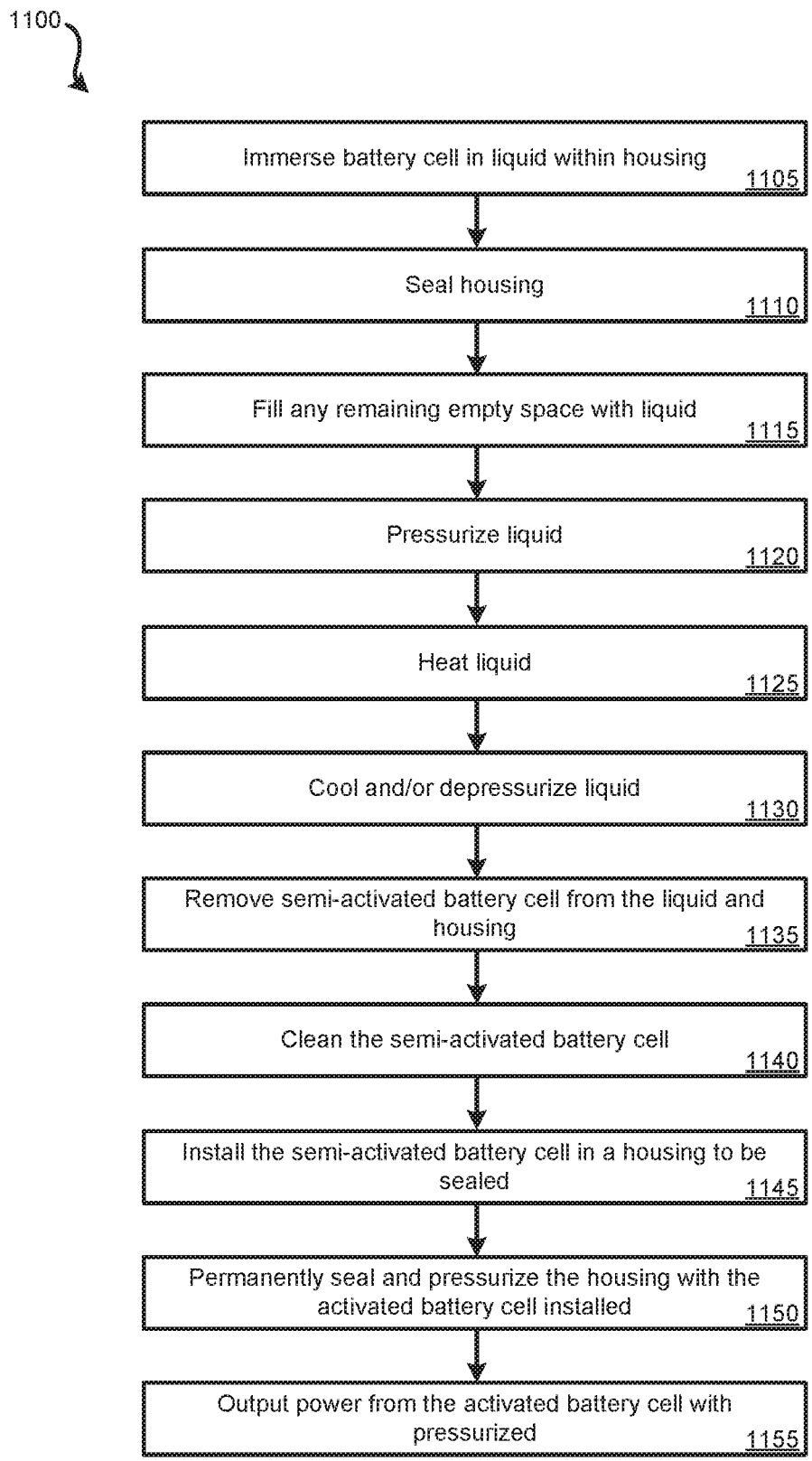
FIG. 11 illustrates an embodiment of a method for activating a battery cell by increasing an amount of contact between an electrolyte and active materials of a battery cell.

FIG. 11 illustrates an embodiment of a method 1100 for activating a battery cell by increasing an amount of contact between an electrolyte and active materials of a battery cell. Method 1100 may be performed using the systems and devices detailed in FIGS. 8-10. Method 1100 may be used as part of a manufacturing process to activate or condition one or more battery cells for use in systems and devices as detailed in relation to FIGS. 1-7.

At block 1105, a battery cell, which may use a solid Li-ion conductive polymer electrolyte, may be immersed in liquid within a housing that can be sealed. The liquid may be a non-electrically conductive, thermally conductive liquid. This liquid may be a type of oil. The battery cell immersed at block 1105 has an electrolyte, anode, and cathode, which may be manufactured as a jelly-roll style cylindrical pouch-style battery cells or planar pouch cells. The battery cell immersed at block 1105 may be functional, however the functionality of the battery cell may be improved by increasing the amount of contact between the anode and the electrolyte and/or the cathode and the electrolyte.

At block 1110, the housing may be sealed with the immersed battery cell inside. At this block, there may be some air space within the sealed housing. In other embodiments, no air space may be present. If some amount of air space is present, at block 1115, additional liquid may be pumped or otherwise added to the interior of the sealed housing. Block 1115 may involve allowing the air to escape. Following block 1115, all of the air or substantially all of the air may be removed such that the battery cell is fully immersed in the liquid (e.g., all external surfaces of the battery are in contact with the liquid).

At block 1120, the liquid may be pressurized within the sealed housing, such as to between 1 MPa and 300 MPa, depending on battery cell type. By virtue of the liquid being pressurized, the pressure may be applied isotropically to the external surfaces (top, bottom, and/or sidewalls) of the battery cell that is immersed in the liquid. The pressure applied at block 1120 may be at least 1 MPa. At block 1125, the liquid may be heated such that the heat is applied approximately isotropically to the external surfaces of the immersed battery cell. In some embodiments, the liquid is heated to between 100° C.-200° C. The battery cell may be heated rapidly compared to if the battery cell was surrounded by air since the liquid has a higher thermal conductance than air. Blocks 1120 and 1125 may be reversed in order or may be performed concurrently in various embodiments. In some embodiments, the liquid may not be heated. The battery cell may remain within the pressurized and/or heated liquid for a period of time, such as between one and ten minutes. Pressure may be created and maintained using a liquid pump. Heat may be generated using one or more Joule heating elements which may be within the walls of the sealed housing, inside of the sealed housing, or external to the sealed housing.

At block 1130, the liquid may be cooled, if heated, and depressurized to the ambient environment's pressure. In some embodiments, the liquid is actively cooled, in other embodiments the liquid is allowed to cool by venting heat into the ambient environment.

At block 1135, the battery cell may be removed from the liquid. The battery cell may be considered semi-activated at this point in time. That is, by blocks 1105-1130 having been performed, the battery has now been semi-activated. The battery cell may be considered activated when it is installed in a pressurized environment, such as detailed at block 1150. At block 1140, the semi-activated battery cell may be cleaned to remove residual liquid on the exterior surfaces of the battery cell.

At block 1145, the semi-activated battery may be installed within a sealable housing in which the battery cell is to charged and discharged. This housing is separate and distinct from the housing used for blocks 1105-1135. The housing used at block 1145 may be a housing that is to function as part of a battery module. Such a sealable housing may be located on-board a vehicle. For example, sealed housing 305 of FIGS. 3 and 7 may be used. Once the battery cell has been installed within the sealable housing, the sealable housing may be sealed with the battery cell inside at block 1150. Liquid, such as oil, which may be the same form of liquid used at block 1120 may be present within the sealable housing such that all or most of the space surrounding the battery cell is occupied by liquid. After the battery cell is inserted into the housing, the amount of liquid within the sealable housing may be topped off or all of the liquid may be added.

At block 1150, the liquid within the housing may be pressurized, such as using a pump. Once the liquid has been pressurized to the desired pressure, the sealable housing may be sealed at block 1150, possibly permanently. The battery cell may now be considered activated. As such, the pressure may be retained by virtue of the sealable housing preventing the pressure from escaping. The pressure created at block 1150 may be less pressure than the pressure applied at block 1120. Similarly, the liquid within the housing may be heated, such as using one or more heating elements, such as heating system 310. The heat created at block 1150 may be less than the heat applied at block 1125 such that the operating temperature is below the temperature at which the battery was activated at block 1125. Heat may be applied to keep the battery within a desired temperature operating range.

At block 1155, the activated battery cell may undergo charge and discharge cycles, such that the activated battery cell, which is within the isotropic pressurized environment, creates electricity that can be used to power a system or device, such as an electric vehicle.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A pressurized battery module, comprising:
a sealed battery module housing;
a plurality of pouch cell arrays, wherein:
each pouch cell array comprises:
a plurality of pouch cells stacked against each other;
a first supporting plate that holds all of the the plurality of pouch cells in place within the pouch cell array;
a second supporting plate that holds all of the the plurality of pouch cells in place within the pouch cell array;
a housing top;
a housing bottom;
a first insulative seal, located between the plurality of pouch cells and the housing top, that functions as a buffer and contacts each pouch cell of the plurality of pouch cells; and
a base insulator, located between the plurality of pouch cells and the housing bottom, that functions as a second buffer and contacts each pouch cell of the plurality of pouch cells; wherein:
the plurality of pouch cells of each pouch cell array are not in contact with pouch cells of other pouch cell arrays of the pressurized battery module; and
a liquid that is pressurized within the sealed housing, wherein the liquid exerts pressure on an external surface of each pouch cell of each pouch cell array of the plurality of pouch cell arrays.

2. The pressurized battery module of claim 1, wherein the liquid is an electrically-insulative oil.

3. The pressurized battery module of claim 1, further comprising:
a plurality of leads; and
a polymer-based sealant, wherein the polymer-based sealant creates a seal for each pouch cell of the plurality of pouch cells through which a lead of the plurality of leads passes between the pouch cell and an external environment outside of the sealed battery module housing.

4. The pressurized battery module of claim 1, wherein each pouch cell comprises a sulfur-based solid-state electrolyte.

5. A pressurized battery module system, comprising:
a heating system, comprising:
one or more heating elements exterior to a sealed battery module housing; and
a circulator, located within the sealed battery module housing, to circulate pressurized liquid;
the sealed battery module housing;
a plurality of pouch cell arrays, wherein:
each pouch cell array comprises:
a plurality of pouch cells stacked against each other;
a first supporting plate that holds the plurality of pouch cells in place within the pouch cell array;
a second supporting plate that holds the plurality of pouch cells in place within the pouch cell array;
a housing top;
a housing bottom;
a first insulative seal, located between the plurality of pouch cells and the housing top, that functions as a buffer and contacts each pouch cell of the plurality of pouch cells; and
a base insulator, located between the plurality of pouch cells and the housing bottom, that functions as a second buffer and contacts each pouch cell of the plurality of pouch cells; wherein:
the plurality of pouch cells of each pouch cell array are not in contact with pouch cells of other pouch cell arrays of the pressurized battery module system; and
a liquid that is pressurized within the sealed housing, wherein the liquid exerts pressure on an external surface of each pouch cell of each pouch cell array of the plurality of pouch cell arrays. of the plurality of pouch cells.

6. The pressurized battery module system of claim 5, wherein the liquid is an electrically-insulative oil.

7. A pressurized battery apparatus, comprising:
a heating means;
a sealed housing means;
a plurality of battery cell arrays, wherein:

each battery cell array comprises:
- a plurality of battery cells that are stacked against each other;
- a first supporting means that holds all of the plurality of battery cells in place within the battery cell array;
- a second supporting means that holds all of the plurality of battery cells in place within the battery cell array;
- a housing top means;
- a housing bottom means;
- a first insulative seal means, located between the plurality of battery cells and the housing top means, that functions as a buffer and contacts each battery cell of the plurality of battery cells; and
- a base insulator means, located between the plurality of battery cells and the housing bottom, that functions as a second buffer and contacts each battery cell of the plurality of battery cells; wherein:
  - the plurality of battery cells of each battery cell array are not in contact with battery cells of other battery cell arrays of the pressurized battery apparatus; and a liquid that is pressurized within the sealed housing means, wherein the liquid exerts pressure on an external surface of each battery cell of the plurality of battery cell arrays.

\* \* \* \* \*

UNITED STATES PATENT AND TRADEMARK OFFICE
CERTIFICATE OF CORRECTION

PATENT NO. : 11,108,075 B2
APPLICATION NO. : 16/217002
DATED : August 31, 2021
INVENTOR(S) : Ken Ogata et al.

Page 1 of 1

It is certified that error appears in the above-identified patent and that said Letters Patent is hereby corrected as shown below:

In the Claims

In Column 12, Claim 5, Line 60, please delete "of the plurality of pouch"

In Column 12, Claim 5, Line 61, please delete "cells."

Signed and Sealed this
First Day of March, 2022

Drew Hirshfeld
*Performing the Functions and Duties of the*
*Under Secretary of Commerce for Intellectual Property and*
*Director of the United States Patent and Trademark Office*